United States Patent
Streuer

(10) Patent No.: US 8,252,439 B2
(45) Date of Patent: Aug. 28, 2012

(54) RECHARGEABLE BATTERY AND SEALING PLUG FOR A RECHARGEABLE BATTERY

(75) Inventor: Peter Streuer, Hannover (DE)

(73) Assignee: Johnson Controls Autobatterie GmbH & Co. KGaA (DE)

(*) Notice: Subject to any disclaimer, the term of this patent is extended or adjusted under 35 U.S.C. 154(b) by 1137 days.

(21) Appl. No.: 10/706,726

(22) Filed: Nov. 12, 2003

(65) Prior Publication Data

US 2004/0137316 A1    Jul. 15, 2004

(30) Foreign Application Priority Data

Nov. 26, 2002  (DE) ................... 102 55 290

(51) Int. Cl.
  *H01M 2/12*   (2006.01)
(52) U.S. Cl. ............. 429/89; 429/90; 429/91; 429/149; 429/163; 429/175
(58) Field of Classification Search ............. 429/149, 429/163, 153, 175, 89, 91, 90; *H01M 10/48, H01M 2/12*
  See application file for complete search history.

(56) References Cited

U.S. PATENT DOCUMENTS

| | | | |
|---|---|---|---|
| 4,201,647 A * | 5/1980 | Spaziante et al. ............. 204/402 |
| D310,821 S | 9/1990 | Hulsebus et al. | |
| 5,284,720 A | 2/1994 | Thuerk et al. | |
| 5,674,640 A | 10/1997 | Mrotek et al. | |
| 5,688,612 A | 11/1997 | Mrotek et al. | |
| 5,702,841 A | 12/1997 | Thomas et al. | |
| 5,856,037 A | 1/1999 | Casale et al. | |
| 6,143,438 A | 11/2000 | Geibl et al. | |
| 6,277,517 B1 * | 8/2001 | Thomas et al. ............... 429/175 |
| 6,461,758 B1 | 10/2002 | Geibl et al. | |
| 6,733,921 B2 * | 5/2004 | Richter et al. ................ 429/180 |

FOREIGN PATENT DOCUMENTS

| | | | | |
|---|---|---|---|---|
| DE | 33 30 823 A1 | | 3/1984 | |
| DE | 3330823 A1 * | | 3/1984 | ..................... 429/82 |
| DE | 198 56 691 A1 | | 6/2000 | |
| DE | 100 23 747 A1 | | 11/2001 | |
| EP | 0 996 986 B1 | | 7/2002 | |

* cited by examiner

*Primary Examiner* — Patrick Ryan
*Assistant Examiner* — Ben Lewis
(74) *Attorney, Agent, or Firm* — Boardman & Clark LLP

(57) ABSTRACT

A rechargeable battery includes a housing comprising at least two cells that can be filled with an electrolyte. The rechargeable battery includes a cover and a degassing system having openings provided therein. The cover and the degassing system are arranged such that the openings provided in the cover and the degassing system are located above the cells of the rechargeable battery. A sealing plug is provided in each of the openings, the sealing plug having an upper part and a lower part having a splash basket. The upper part covers the openings on the outside of the cover and the lower part extends in the direction of the cells. The splash basket surrounds a cavity and has slots distributed over its circumference, the slots continuing as far as a free end of the splash basket.

19 Claims, 2 Drawing Sheets

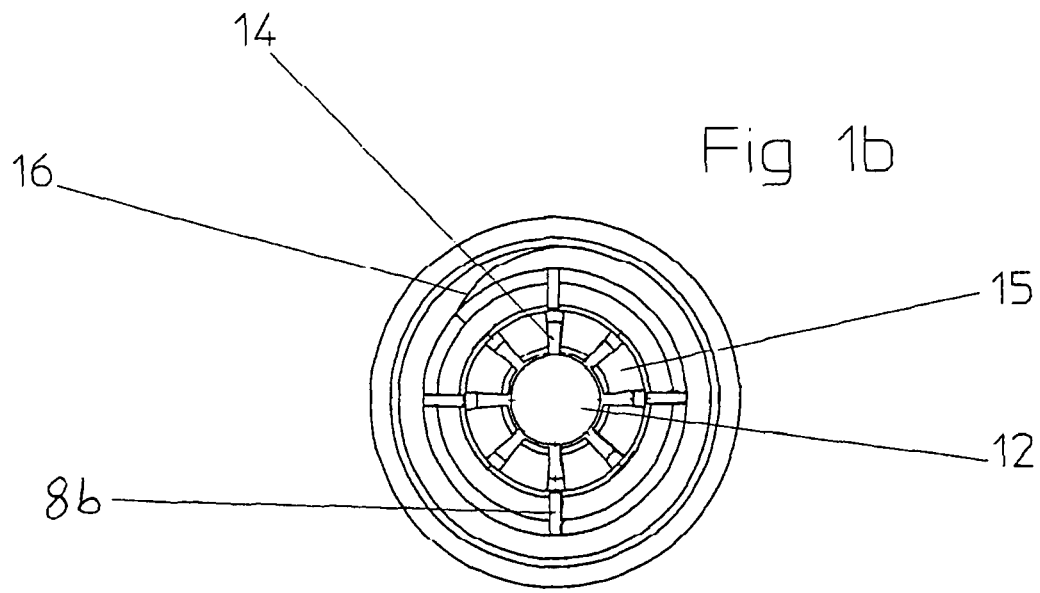
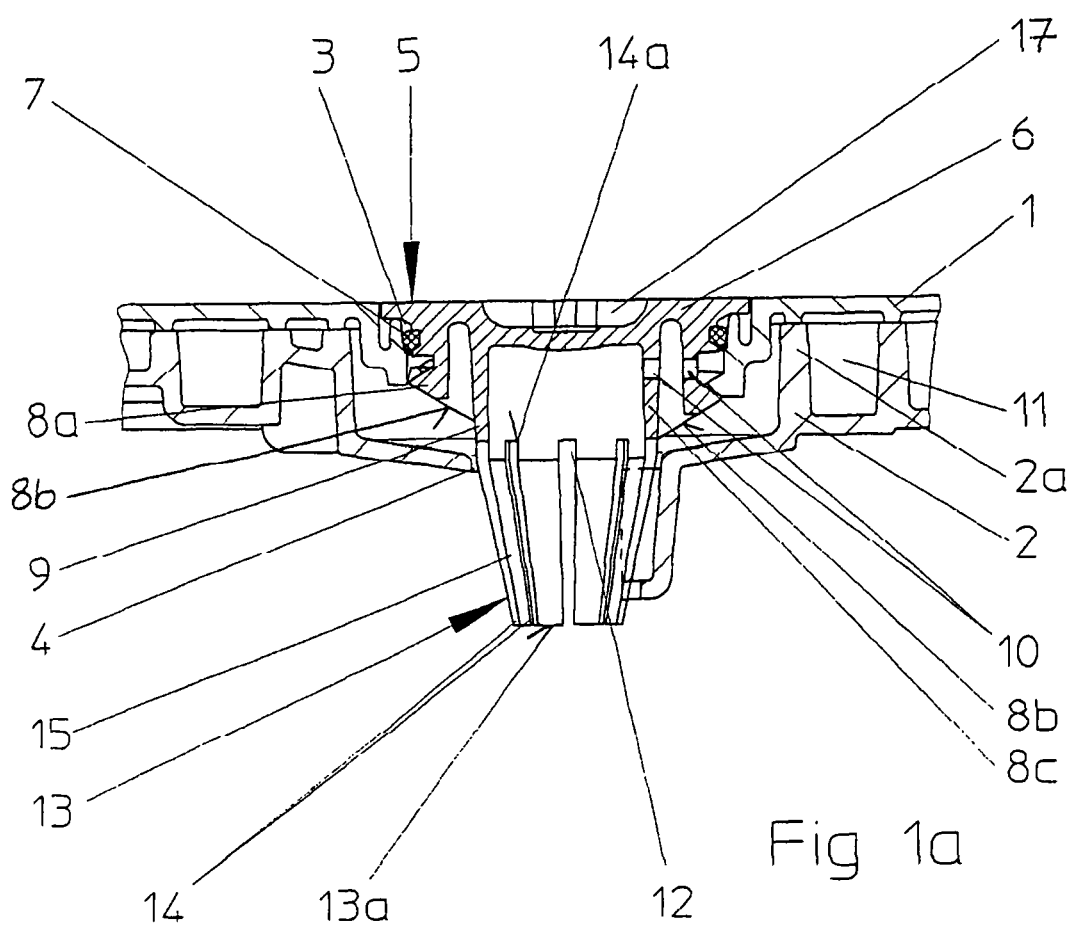

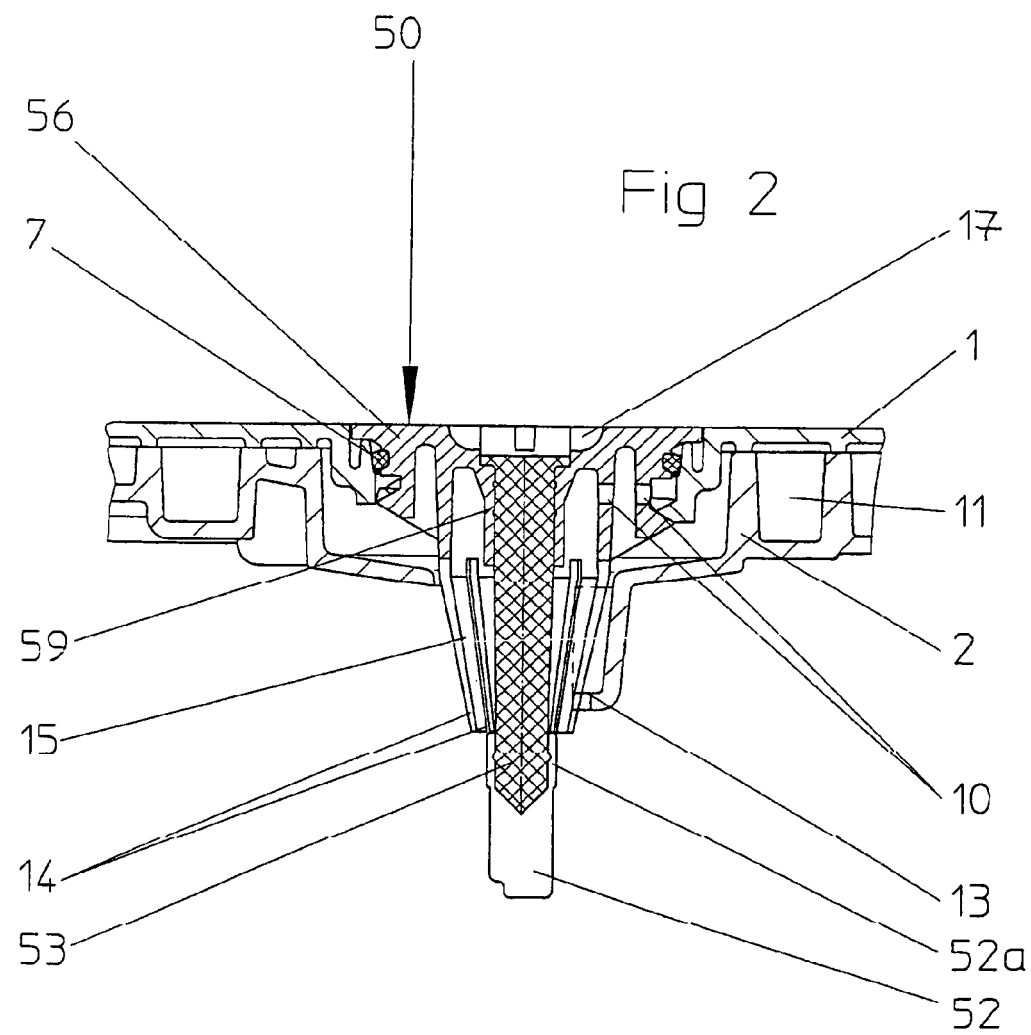

RECHARGEABLE BATTERY AND SEALING PLUG FOR A RECHARGEABLE BATTERY

CROSS-REFERENCE TO RELATED PATENT APPLICATIONS

Germany Priority Application DE 102 55 290.8-45, filed Nov. 26, 2002, including the specification, drawings, claims, and abstract, is incorporated herein by reference in its entirety.

BACKGROUND OF THE INVENTION

The present invention relates to a battery (e.g., a rechargeable lead-acid vehicle battery for use in starting, lighting, and ignition applications). More specifically, the present invention relates to sealing plugs for use with such batteries.

A plug arrangement for sealing a cell opening in a rechargeable battery in a gastight manner is known from DE 100 23 747 A1. In this case, the cell interior is connected via an opening in the outer surface of the sealing plug to a cavity which is formed between an upper part and lower part of the housing cover. The opening is in this case provided with a two-way sealing membrane. In this case, the sealing plug must be inserted carefully in order to avoid damage to the sealing membrane.

EP 0 996 986 B1 describes a plug for sealing battery cells, which has an essentially cylindrical housing which is formed from plastic and is open at the bottom, and whose upper opening can be closed by a cover. When the plug is fitted in a rechargeable battery, then gases which rise out of the cells and vaporized liquid can be held by a labyrinth insert which is provided in the area of the upper opening of the plug housing. Facing the cells, the labyrinth insert has pins, from which condensing liquid can drip downwards into the cell. A basket which runs conically towards the cell is provided in a lower opening of the plug such that it can be moved longitudinally and is used for checking the liquid and for checking the replenishment of the liquid. In this case, it is difficult to insert the plug into the rechargeable battery since, first of all, the basket must be inserted into an opening above the cells, and the upper part of the plug must then be inserted precisely at right angles to the cover of the rechargeable battery.

Furthermore, a sealing plug for a rechargeable battery is known from DE 33 30 823 A1, which has an insert part which can be inserted into an opening in the rechargeable battery cover. The insert part which can be sealed by a cover is connected to a filling nozzle, which merges integrally with an acid cage. The acid cage is used to check the acid level of the rechargeable battery and has circumferential slots which are bounded by a lower edge. Once again, the insertion of the plug is difficult, particularly in the event of manufacturing discrepancies between the opening dimensions and the standard sizes.

An electrical rechargeable battery which is described by the Laid-Open Specification DE 198 56 691 A1 has degassing plugs which are arranged in a cell cover and on whose lower part a splash basket is provided. On its circumference, the splash basket has slots which widen downwards. The splash basket likewise has a base, which is tilted inwards and extends upwards in a conical shape towards the center of the plug. At the bottom, the slots are bounded by the base. This makes the degassing plug stiff, which means that the degassing plug must be inserted accurately at right angles to the cell cover.

It would be advantageous to provide sealing plugs for a battery which may be inserted into filling openings of the battery in a relatively simple and efficient manner. It would also be advantageous to provide sealing plugs that enable sealing of filling openings even if there is, for example, a manufacturing-dependent offset between the openings of the cover and the openings in the degassing system located underneath it. It would also be advantageous to provide a battery having sealing plugs that are configured to allow for relatively forgiving insertion of the sealing plugs into openings provided in the battery. It would be advantageous to provide batteries and sealing plugs having any one or more of these or other advantageous features.

SUMMARY

An exemplary embodiment relates to a rechargeable battery having a housing comprising at least two cells that can be filled with an electrolyte. The rechargeable battery includes a cover and a degassing system having openings provided therein. The cover and the degassing system are arranged such that the openings provided in the cover and the degassing system are located above the cells of the rechargeable battery. A sealing plug having an upper part and a lower part having a splash basket is provided in each of the openings. The upper part covers the openings on the outside of the cover and the lower part extends in the direction of the cells. The splash basket surrounds a cavity and has slots distributed over its circumference, the slots continuing as far as a free end of the splash basket.

Another exemplary embodiment relates to a sealing plug for sealing openings which are incorporated above cells in a rechargeable battery. The sealing plug includes an upper part and a lower part which ends in a splash basket. The splash basket includes slots provided along its circumference, the slots continuing as far as a free end of the splash basket.

BRIEF DESCRIPTION OF THE DRAWINGS

The invention will be explained in more detail in the following text using a number of exemplary embodiments and in conjunction with the accompanying FIGURES, with similar elements being provided with the same reference numerals.

FIG. 1a shows a partial section through a rechargeable battery according to an exemplary embodiment.

FIG. 1b shows a view from underneath of a sealing plug according to an exemplary embodiment.

FIG. 2 shows a sealing plug according to an exemplary embodiment inserted into a rechargeable battery.

DETAILED DESCRIPTION OF THE PREFERRED AND EXEMPLARY EMBODIMENTS

According to an exemplary embodiment, a battery (e.g., a rechargeable lead-acid vehicle battery for use in starting, lighting, and ignition applications) includes a housing which has two or more cells that can be filled with an electrolyte. The battery is also provided with a cover and a degassing system. The degassing system and cover are arranged such that openings which are incorporated in each of them are located above the cells. A sealing plug is also provided that can be introduced into each of the openings (e.g., for sealing openings which are incorporated above the cells in the battery) such that an upper part of the sealing plug covers the openings on the outside, and a lower part of the sealing plug extends in the direction of the cells and has a splash basket which surrounds a cavity and has longitudinal slots distributed over its circumference. According to an exemplary embodiment, the slots continue as far as a free end of the splash basket.

One advantageous feature of such an arrangement is that the cover of a rechargeable battery can be sealed relatively easily by means of the sealing plug (e.g., the sealing plug need not be inserted absolutely at right angles to the cover surface). If the sealing plug is inserted obliquely into the cover of a rechargeable battery, and the splash basket in the process abuts against the inner walls of the rechargeable battery, then the insertion process can be continued further to its final position owing to the flexibility provided for the splash basket by means of the continuous slots.

According to an exemplary embodiment, the sealing plug is integral. The splash basket elasticity which is achieved by the slots is in this case advantageously transferred to the entire sealing plug. It is particularly preferable for the sealing plugs to be produced using a plastic injection-molding method. This results in the advantage of slight elasticity in the longitudinal direction as well. The mobility of the plates, which are formed by the slots, of the splash basket allows the sealing plug to be inserted into the cover via the openings even without being centered exactly.

The degassing system for holding electrolyte gases can also be connected, when the sealing plug is inserted, to the slots via an opening which is provided in the sealing plug, such that the slots form return paths for electrolyte entering the degassing system. Liquid drops which enter the degassing system can advantageously in this case be passed back into the cell again.

In another embodiment of the invention, the sealing plug contains a state of charge indicator and/or an electrolyte level indicator which is attached to its upper part and passes through the lower part and the cavity, which is surrounded by the splash basket, in the longitudinal direction. The state of charge indicator and/or electrolyte level indicator in this case preferably projects so far out of the free end that it enters the electrolyte when the electrolyte level is normal.

The state of charge indicator and/or electrolyte level indicator may also have a roughened surface, at least on a gauge which is fitted to it. The splash basket preferably likewise has a roughened surface. This reduces the occurrence of electrolyte liquid rising out of the cells (e.g., due to capillary forces).

The sealing plug can also be formed from an electrically conductive plastic in order to avoid electrostatic charges. In this case, a potential difference can advantageously be avoided by at least one of the plates of the splash basket touching or contacting the electrolyte.

According to an exemplary embodiment, the sealing plug includes a seal which is fitted, preferably injection-molded, onto the upper part and provides an external seal for the cover of the rechargeable battery when the sealing plug is inserted. A thread for mating with an opposing thread that is provided on the upper part of the sealing plug can also be provided on the cover of the rechargeable battery.

As is shown in FIG. 1a, a cover 1 for the rechargeable battery according to an exemplary embodiment is provided above a degassing system 2 which is shown in the form of a hollow body. The cover 1 in this case rests on supporting webs or elements 2a of the degassing system 2. A sealing plug 5 is inserted into openings 3 and 4 (which are arranged one above the other) in the cover 1 and in the degassing system 2. When the sealing plug 5 is inserted, the opening 3 is closed in an airtight and liquid-tight manner on the outside via a sealing washer 7 which is injection-molded along the circumference of an upper part 6 of the sealing plug 5. As is shown in FIG. 1a, the sealing plug 5 is attached to the cover 1 by means of a thread 16. In the process, a thread pitch 8a engages in a thread pitch which is applied to the cover 1.

An opening 10 is provided on one side wall 8c of a lower part 9 of the sealing plug 5 and connects the degassing channel 11 for the degassing system 2 to the cell interior (not shown) via a cavity 12 which is surrounded by the sealing plug 5 and is open at the bottom.

The lower part 9 of the sealing plug 5 is followed in the direction of the cell by a splash basket 13 whose lower face 13a is open. The splash basket 13 is in the form of a truncated cone. Starting from the lower face 13a, slots 14 run along the outer surface of the splash basket 13 towards the lower part 9. The slots 14 become broader from the lower face 13a of the splash basket 13 to their end 14a in the lower part 9. The outer surface of the splash basket 13 is subdivided by the slots into plates 15. The slots 14 and the plates 15 in the sealing plug 5, which is manufactured as a plastic injection-molded part, make the splash basket 13 elastically deformable, in particular in response to laterally applied forces.

The slots 14 are used as return paths for electrolyte liquid which has risen during a degassing process in the rechargeable battery out of the cells in the direction of the cover 1, and to run back from this out of the degassing system 2 into the cells. The lower face 13a of the splash basket 13 generally touches or contacts (e.g., enters) the electrolyte when the battery has a normal electrolyte level in the cells. The electrolyte level on some of the plates 15 may rise due to movements and in particular to oblique positioning of the rechargeable battery. In order in this case to prevent the electrolyte from being able to rise in the slots 14 in the splash basket 13 towards the cover 1, for example as a result of capillary forces, after a drop in the electrolyte level, the plates 15 have a relatively rough surface.

According to FIG. 1b, the thread 16 is radially supported by the supporting ribs 8b with respect to the center of the sealing plug 5. The screwing-in process can be made easier by means of a recess 17 (FIG. 1a), which is used as a screwing-in aid, on the upper part 6 of the sealing plug 5.

FIG. 2 shows a sealing plug 50 and a rechargeable battery according to another exemplary embodiment. An element 52 in the form of a state of charge indicator and electrolyte level indicator is provided which is fitted to an upper part 56 and passes through the splash basket 13 in the direction of the cells of the battery (not shown). The state of charge indicator and electrolyte level indicator 52 has a gauge 53 which, starting from the upper part 56, passes through a lower part 59 and the splash basket 13 as far as a broadened lower section 52a of the state of charge indicator and electrolyte level indicator 52. The gauge 53 on the state of charge indicator and electrolyte level indicator 52 enters the electrolyte when the electrolyte level is normal. Once the sealing plug 50 has been removed, the electrolyte filling level in the rechargeable battery can then be checked and/or measured on the gauge 53. The gauge 53 has a relatively rough surface which is used for electrolyte, which at times rises above a normal electrolyte level in the direction of the cover 1, to run out.

It is important to note that the construction and arrangement of the elements of the battery and sealing plug as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements (e.g., portions of the sealing plugs may be manufactured separately and assembled), the position of elements may be reversed or otherwise varied, and the nature or number of discrete elements or positions may be altered or varied. It should be noted that the elements and/or assemblies of the system may be constructed from any of a wide variety of materials that provide sufficient strength or durability, including any of a wide variety of moldable plastic materials (such as high-impact plastic) in any of a wide variety of colors, textures and combinations. Other substitutions, modifications, changes and omissions may be made in the design, operating conditions and arrangement of the preferred and other exemplary embodiments without departing from the scope of the present inventions.

What is claimed is:

1. A rechargeable battery having a housing comprising at least two cells that can be filled with an electrolyte, the rechargeable battery comprising:
   a degassing system having openings provided therein, a cover and the degassing system arranged such that the openings are located above the cells of the rechargeable battery; and
   a sealing plug provided in each of the openings, the sealing plug having an upper part and a lower part, the lower part comprising a splash basket that has an inner cavity that decreases in size from an upper end of the splash basket to a terminal end of the splash basket, wherein an acid level indicator is attached to the upper part of the sealing plug and the acid level indicator has a roughened surface;
   wherein the splash basket comprises a plurality of plates that extend from the upper end of the splash basket to the terminal end of the splash basket, the plates separated from each other by slots that extend to the terminal end of the splash basket such that the plates are not coupled together at the terminal end of the splash basket to allow free movement of the plates at the terminal end of the splash basket.

2. The rechargeable battery of claim 1 wherein the upper part covers the openings on the outside of the cover and the lower part extends in the direction of the cells.

3. The rechargeable battery of claim 1 wherein each of the slots has a width that broadens with increasing distance from the terminal end of the splash basket.

4. The rechargeable battery of claim 1 wherein the sealing plug has an opening provided therein separate from the slots and adjacent to the openings of the degassing system and the degassing system is connected to the splash basket via the opening in the sealing plug such that the slots form return paths for electrolyte from the degassing system.

5. The rechargeable battery of claim 1 wherein the sealing plug is integrally formed as part of the degassing system.

6. The rechargeable battery of claim 1 wherein the splash basket has a roughened surface.

7. The rechargeable battery of claim 1 wherein the terminal end of the splash basket contacts electrolyte provided in the cells.

8. The rechargeable battery of claim 1, further comprising a cover, wherein the sealing plug has a seal which is fitted to the upper part of the sealing plug for sealing the cover.

9. A sealing plug for sealing openings which are incorporated above cells in a rechargeable battery, the sealing plug comprising:
   an upper part; and
   a lower part which ends in a splash basket, the splash basket having an upper end and a lower terminal end, the splash basket defining an opening that increases in size with increasing distance from the terminal end of the splash basket;
   a state of charge indicator and electrolyte level indicator provided in the upper part and passing through the splash basket, the state of charge indicator and electrolyte level indicator projecting at the terminal end of the splash basket, wherein at least one of the state of charge indicator and the electrolyte level indicator has a roughened surface;
   wherein the splash basket comprises a plurality of plates separated by slots that extend from the upper end of the splash basket to the terminal end of the splash basket, the slots narrowing in width from an upper end of the splash basket to the terminal end of the splash basket;
   wherein the plates are not connected to adjacent plates at the terminal end of the splash basket to allow free movement of the plates relative to each other upon insertion into an opening of the rechargeable battery.

10. The rechargeable battery of claim 9 wherein the terminal end of the splash basket is configured to contact electrolyte provided in the rechargeable battery.

11. The rechargeable battery of claim 9 wherein the sealing plug is formed from an electrically conductive plastic.

12. A rechargeable battery having a housing comprising at least two cells that can be filled with an electrolyte, the rechargeable battery comprising:
   a degassing system having openings provided therein, a cover and the degassing system arranged such that the openings are located above the cells of the rechargeable battery; and
   a sealing plug provided in each of the openings, the sealing plug having an upper part and a lower part, the lower part comprising a splash basket that has an inner cavity that decreases in size from an upper end of the splash basket to a terminal end of the splash basket, wherein a state of charge indicator is attached to the upper part of the sealing plug and the state of charge indicator has a roughened surface;
   wherein the splash basket comprises a plurality of plates that extend from the upper end of the splash basket to the terminal end of the splash basket, the plates separated from each other by slots that extend to the terminal end of the splash basket such that the plates are not coupled together at the terminal end of the splash basket to allow free movement of the plates at the terminal end of the splash basket.

13. The rechargeable battery of claim 12 wherein the upper part covers the openings on the outside of the cover and the lower part extends in the direction of the cells.

14. The rechargeable battery of claim 12 wherein each of the slots has a width that broadens with increasing distance from the terminal end of the splash basket.

15. The rechargeable battery of claim 12 wherein the sealing plug has an opening provided therein separate from the slots and adjacent to the openings of the degassing system and the degassing system is connected to the splash basket via the opening in the sealing plug such that the slots form return paths for electrolyte from the degassing system.

16. The rechargeable battery of claim 12 wherein the sealing plug is integrally formed as part of the degassing system.

17. The rechargeable battery of claim 12 wherein the splash basket has a roughened surface.

18. The rechargeable battery of claim 12 wherein the terminal end of the splash basket contacts electrolyte provided in the cells.

19. The rechargeable battery of claim 12, further comprising a cover, wherein the sealing plug has a seal which is fitted to the upper part of the sealing plug for sealing the cover.

* * * * *